(12) United States Patent
Hirsch et al.

(10) Patent No.: US 9,007,300 B2
(45) Date of Patent: Apr. 14, 2015

(54) METHOD AND SYSTEM TO CONTROL A PROCESS WITH BEND MOVEMENTS

(75) Inventors: Alexander Samson Hirsch, Highland Park, IL (US); Michael Joseph DeLuca, Boca Raton, FL (US)

(73) Assignee: BlackBerry Limited (CA)

( * ) Notice: Subject to any disclaimer, the term of this patent is extended or adjusted under 35 U.S.C. 154(b) by 185 days.

(21) Appl. No.: 13/273,717

(22) Filed: Oct. 14, 2011

(65) Prior Publication Data
US 2013/0093660 A1 Apr. 18, 2013

(51) Int. Cl.
*G09G 5/00* (2006.01)
*G06F 1/16* (2006.01)

(52) U.S. Cl.
CPC ............ *G06F 1/1652* (2013.01); *G06F 1/1694* (2013.01)

(58) Field of Classification Search
None
See application file for complete search history.

(56) References Cited

U.S. PATENT DOCUMENTS

| | | | |
|---|---|---|---|
| 6,243,075 B1 | 6/2001 | Fishkin et al. | |
| 6,943,773 B2 | 9/2005 | Wong et al. | |
| 7,109,967 B2 | 9/2006 | Hioki et al. | |
| 7,298,365 B2 | 11/2007 | Moriyama | |
| 7,342,569 B2 | 3/2008 | Liang et al. | |
| 7,394,452 B2 | 7/2008 | Wong et al. | |
| 7,443,380 B2 | 10/2008 | Nozawa | |
| 7,652,819 B2 * | 1/2010 | Watanabe et al. | 359/446 |
| 8,009,421 B2 * | 8/2011 | Misawa | 361/679.55 |
| 8,082,003 B2 * | 12/2011 | Jee | 455/556.1 |
| 8,149,211 B2 * | 4/2012 | Hayakawa et al. | 345/156 |
| 2004/0008191 A1 | 1/2004 | Poupyrev et al. | |
| 2006/0238494 A1 | 10/2006 | Narayanaswami et al. | |
| 2006/0274036 A1 | 12/2006 | Hioki et al. | |
| 2007/0247422 A1 | 10/2007 | Vertegaal et al. | |
| 2009/0120696 A1 * | 5/2009 | Hayakawa et al. | 178/18.05 |
| 2010/0011291 A1 | 1/2010 | Nurmi | |
| 2010/0029335 A1 * | 2/2010 | Vartanian | 455/566 |
| 2010/0053073 A1 | 3/2010 | Cohen et al. | |
| 2010/0053074 A1 | 3/2010 | Cohen et al. | |
| 2010/0053075 A1 | 3/2010 | Cohen et al. | |
| 2010/0053076 A1 | 3/2010 | Cohen et al. | |
| 2010/0066685 A1 | 3/2010 | Cain et al. | |
| 2010/0085301 A1 | 4/2010 | Cohen et al. | |
| 2010/0103123 A1 | 4/2010 | Cohen et al. | |
| 2010/0117954 A1 | 5/2010 | Cohen et al. | |

(Continued)

FOREIGN PATENT DOCUMENTS

| | | |
|---|---|---|
| EP | 1967937 A1 | 9/2008 |
| EP | 2150031 A1 | 2/2010 |

(Continued)

OTHER PUBLICATIONS

"Canadian Application Serial No. 2,792,253, Office Action mailed May 21, 2014", 3 pgs.

(Continued)

*Primary Examiner* — Van Chow
(74) *Attorney, Agent, or Firm* — Schwegman Lundberg & Woessner, P.A.

(57) ABSTRACT

Various embodiments include devices, methods, circuits, data structures, and software that allow for control of a process through detecting of movements in bends in a flexible display device. In an example, a method for controlling a process through bend movements can include detecting movement of a bend in a deformable display panel and modifying a process running on a computing device response to detecting the movement of the bend.

13 Claims, 7 Drawing Sheets

(56) References Cited

U.S. PATENT DOCUMENTS

| | | | |
|---|---|---|---|
| 2010/0117955 | A1 | 5/2010 | Cohen et al. |
| 2010/0120470 | A1 | 5/2010 | Kim et al. |
| 2010/0124879 | A1 | 5/2010 | Cohen et al. |
| 2010/0141605 | A1 | 6/2010 | Kang et al. |
| 2010/0164973 | A1 | 7/2010 | Huitema et al. |

FOREIGN PATENT DOCUMENTS

| | | | |
|---|---|---|---|
| EP | 2202624 | A2 | 6/2010 |
| GB | 2456512 | A | 7/2009 |
| WO | WO-2008108645 | A1 | 9/2008 |
| WO | WO-2008150600 | A1 | 12/2008 |
| WO | WO-2010004080 | A1 | 1/2010 |
| WO | WO-2010041227 | A1 | 4/2010 |

OTHER PUBLICATIONS

"Cobra: Flexible Displays for Mobile Gaming Scenarios", [Online]. Retrieved from the Internet: <URL: http://www.hml.queensu.ca/files/cobra.pdf>, 5 pgs.

"European Application Serial No. 11185329.7, Extended Search Report mailed Mar. 15, 2012", 13 pgs.

"European Application Serial No. 11185329.7, Response filed Oct. 5, 2012 to Search Report mailed Mar. 15, 2012", 14 pgs.

"Queens University Human Media Lab", [Online]. Retrieved from the Internet: <URL: http://www.hml.queensu.ca>, 3 pgs.

"The Future of User Interfaces", [Online]. Retrieved from the Internet: <URL: Downloaded from http://sixrevisions.com/user-interface/the-future-of-user-interfaces/>, (Accessed on Jul. 14, 2011), 21 pgs.

Dries, "Touch Affordances Workshop Outcome", Interact, [Online] Retrieved from the Internet: <http://www.touchaffordances.org/?page_id=74>, (Sep. 4, 2009), 6 pgs.

Goyal, Nitesh, "COMET: Collaboration in Applications for Mobile Environments by Twisting", Interact, (2009), 1-6.

Lahey, Byron, et al., "PaperPhone: Understanding the Use of Band Gestures in Mobile Devices with Flexible Electronic Paper Displays", CHI Session: Flexible Grips & Gestures, (May 2011), 1303-1312.

ディスプレイを曲げることで表示の拡大・縮小を直感操作 (approximately: "Intuitive operation of a bendable display") [Video], [Online]. Retrieved from the Internet: <URL: http://www.youtube.com/watch?v=NGDyxA4BPH4>, (Uploaded 2010), 25 seconds.

"Foldable User Interfaces and Origami Input Devices [Video]", [Online]. Retrieved from the Internet: <URL: http://www.youtube.com/watch?v=e6jJp-AWFFY>, (Uploaded 2008), 3 min, 21 sec.

\* cited by examiner

METHOD AND SYSTEM TO CONTROL A PROCESS WITH BEND MOVEMENTS

BACKGROUND

Development involving mobile devices has rapidly advanced display technology; one area of continued development involves flexible display technology. As the capabilities of the display technology advance, so too does a consumer's expectations in terms of functionality and esthetics associated with the display. In the area of functionality, consumers continue to demand enhancements in the ability to interact with the new display and mobile device formats. For example, recent advances in mobile device computing have incorporated the ability for touch sensitive displays to react to multiple touches simultaneously (e.g., multi-touch). Multi-touch input has increased the range of available inputs available through touch sensitive displays (e.g., increased the number of ways a user can affect processes running on the mobile device through touch input).

DETAILED DESCRIPTION

Figure 1:
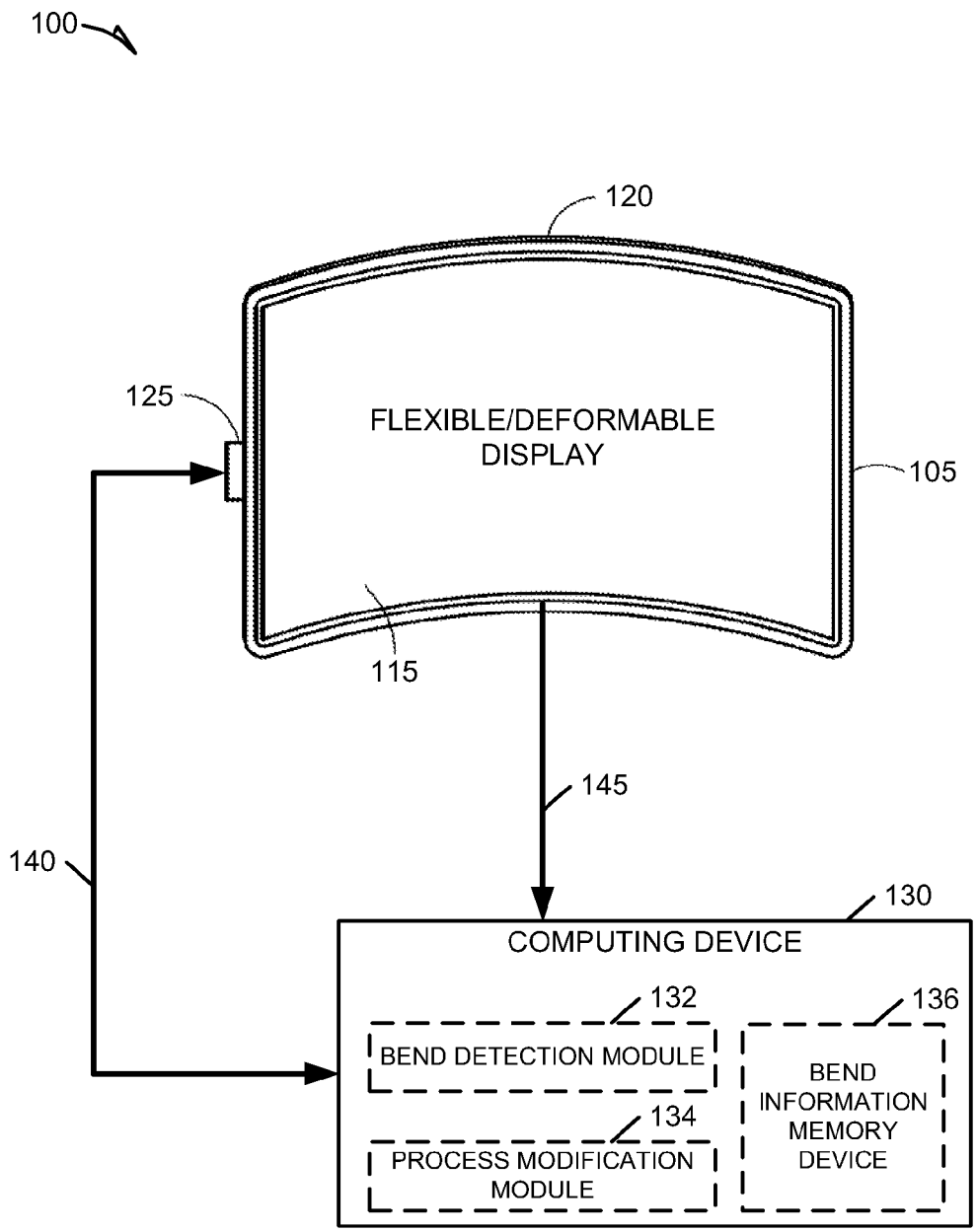
FIG. 1 is a block diagram illustrating a computing system including a flexible display, according to an example embodiment.

In the following description, numerous specific details are set forth in order to provide a thorough understanding of example embodiments. It is to be understood, however, that the various embodiments may be practiced without these specific details. For example, logical, electrical and structural changes may be made without departing from the spirit and scope of the present subject matter. The following detailed description is, therefore, not to be taken in a limiting sense.

Methods and systems to control a process with bend movements detected within a flexible display device are discussed. It has been discovered that deforming a flexible display (such as by bending, twisting, or otherwise changing the shape from the default shape of the flexible display device) can produce signals indicative of specific deformations. Further, it has been discovered that movement of the deformations across the surface of the flexible display can be detected and tracked. The combination of deformation detection and deformation movements can be used to invoke or modify processes running on a computing device. For example, it has been discovered that deforming a flexible display so that a bend moves from one side of the display to the other can be distinguished from other specific movements of bends or twists, such that a specific user interface operation can be associated with individual bend movements or combinations of bend movements.

In an example, moving a bend from left to right across a flexible display can cause a page to be turned within an e-reader application (process) running on a computing device. In another example, moving a bend from the bottom of a flexible display to the top can cause a document to scroll a similar amount within a word processing application running on a computing device. In certain examples, the speed or direction of the bend or deformation movement can be detected and used to alter the associated process modification. For example, in the scrolling examples, if the bend movement is fast, the amount of scroll applied to the document can be increased proportionally. In another example, moving a deformation diagonally across a flexible display can control zoom within an image processing application running on a computing device. In the image processing example, deformation movement up and to the left (relative to the display) can cause the image to be enlarged. Alternatively, deformation movement down and to the right can cause the image size to be reduced.

The following description should be read with reference to the drawings, in which like elements in different drawings are numbered in like fashion. The drawings, which are not necessarily to scale, depict illustrative embodiments and are not intended to limit the scope of the claims appended hereto. Although examples of various steps are illustrated in the various views, many of the examples provided have suitable alternatives that can be utilized. Moreover, while several illustrative applications are described throughout the disclosure, it should be understood that the present technology could be employed in other applications where bendable or flexible display technology is of value.

DEFINITIONS

Flexible/Deformable Display—The following specification refers to flexible and/or deformable displays and display devices. For the purposes of this specification, a flexible or deformable display is any device, capable of displaying computer generated graphics or text, that can be bent or deformed by a user. Deformations can include bending, folding, rolling, or any other non-destructive change in the shape of the surface of the display device. The deformations of a flexible display discussed within this document are not intended to include the minute deformation that may occur during use of a typical touch screen type display device (e.g., deformation caused by pushing a finger against a touch screen display).

Bend—For the purposes of this specification, to bend an item (e.g., a display panel) is to change the shape of the item so that it is no longer substantially straight or flat. Alternatively, a bend can represent some form of deformation from a resting or original state of a non-planar display. A bend in an item defines a localized change in the normal or original shape. A bend, for the purposes of this specification, has a location defined by the apex of the change in shape (or deformation). Additionally, for the purposes of this specification, a bend has an axis that includes an angle of orientation relative to the flexible display device.

Twist—For the purposes of this specification, to twist an item (e.g., a flexible display panel) is to change the shape of the item by bending it is two different directions at substantially the same time.

Bend Gesture—For the purposes of this specification, a bend gesture is a bend or twist deformation induced on a flexible display combined with movement of the bend or twist deformation across the flexible display. Bend gestures can be used to modify, activate, or cancel a process, among other things.

Process—For the purposes of this specification, a process when discussed in terms of a process running on a computerized device (e.g., laptop computer, smart phone, tablet computer, etc. . . . ) refers to an operating system depend resource allocation to execute program code. For example, a process can define memory space and reference identification for running a segment of code to perform a specific function on a particular device. The term process may also be used within the specification to describe a sequence of operations performed manually or within a computerized system. When process is discussed in terms of operations running within a computerized system, the operations may be programming code executed by one or more processors, firmware programmed into a programmable hardware device to perform a series of operations, or a hardware device designed to perform a series of operations.

FIG. 1 is a block diagram illustrating a computing system 100 including a flexible display, according to an example embodiment. The computing system 100 can include flexible display device 105 communicatively coupled to computing device 130 via interface 125. Although depicted as a standalone device, display device 105 may be a component of another device or system, such as a smart phone, mobile phone, portable computer (such as a laptop or notebook computer), computing tablet, remote control, reading device or other portable electronic device (represented here by computing system 100). Display device 105 is a deformable display device. Although the default shape 115 of display device 105 can be substantially planar, display device 105 can be bendable or deformable to provide for bending or contouring 120 of the display. Deformation of the display device 105 can be performed by any agent (for example, by actions of a person or by mechanical action such as by a machine, or by a combination thereof).

In an example, the display device 105 can be coupled to the computing device 130 to receive image data, such as over an interface 140. According to various examples, the image data received over interface 140 can be analog or digital, for example, but are not limited to component video, digital visual interface (DVI), video graphics array (VGA) or high-definition multimedia interface (HDMI) video control signals. The display device 105 can also be coupled to the computing device 130, such as over an interface 145, to provide deformation signals to the computing device 130. Examples of the deformation signals sent over interface 145 are discussed further below in reference to FIG. 2.

According to an example, the computing device 130 can include a bend detection module 132, a process modification module 134, and a bend (or deformation) information memory device 136. In an example, the bend detection module 132 can receive the deformation signals from the flexible display device 105. The bend detection module 132 can analyze the deformation signals to determine bend or deformation locations and any movement associated with a particular bend or deformation. In certain examples, the bend detection module 132 can store bend information within the bend information memory device 136. The bend information can include data representing each detected deformation within the flexible display device 105. The bend information can also incorporate movement information associated with each detected deformation. For example, the bend detection module 132 can track the apex of a bend, if the apex is detected as moving beyond a pre-defined distance from its originally detected location, the bend detection module 132 can indicate a bend movement. Bend movements may also be detected when a first bend is followed closely in time by a second bend, where the two bends have a pre-defined association.

According an example, the process modification module 134 can use information regarding deformations and associated movements of the deformations to modify processes (e.g., applications, threads, and the like) running on the computing device 130. In certain examples, the process modification module 134 receives deformation data directly from the bend detection module 132. In other examples, the process modification module 134 can obtain deformation data stored in the bend information memory device 136. According to some examples, the process modification module 134 analyzes the bend (or deformation) data to select from a set of pre-defined control patterns. In these examples, the control patterns can include one or more commands to be issued by system level processes running on the computing device 130. These system level processes can issue commands that modify other processes operating within the computing device 130. For example, the computing device 130 can include a user interface control sub-system (not shown in FIG. 1) that can issue user interface related commands to applications running on the computing device 130.

Figure 2:
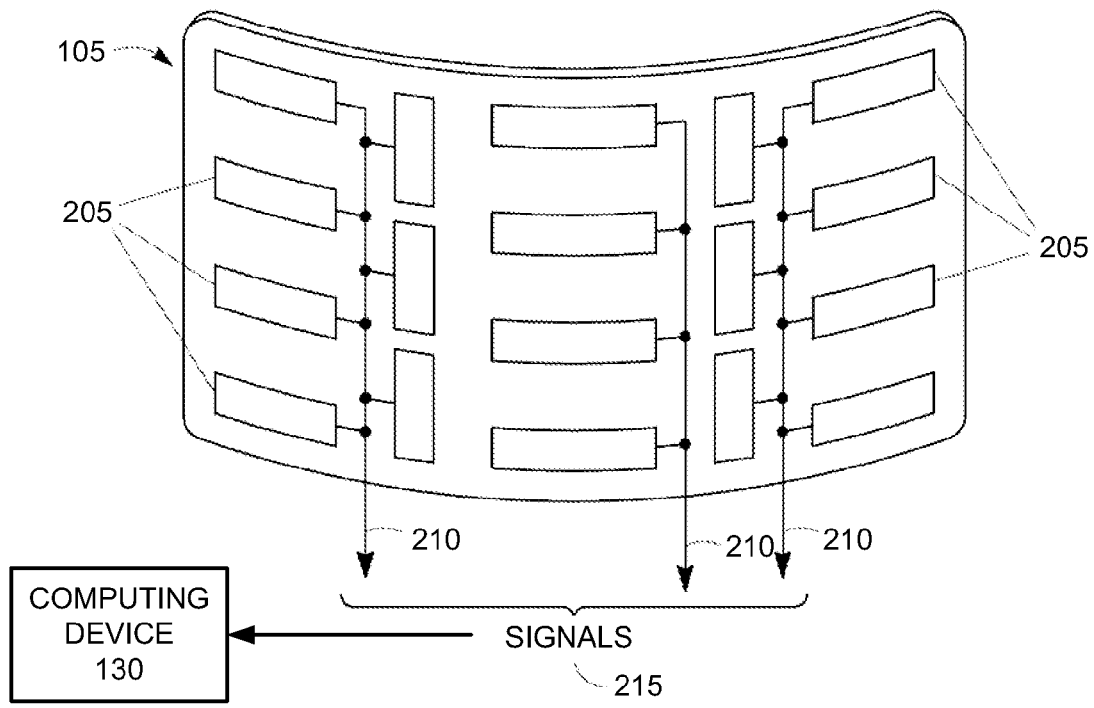
FIG. 2 is a block diagram of a flexible display illustrating circuits to detect bends or other deformations, according to an example embodiment.

FIG. 2 is a block diagram of a flexible display device 105 illustrating circuits 210 to detect bends or other deformations, according to an example embodiment. The circuits 210 within the flexible display device 105 can include bend sensors 205 (also referred to in certain examples as load cells 205). As illustrated schematically in FIG. 2, the bend or deformation properties or characteristics of display device 105 can be obtained using one or more deformation detection devices, for example, taking the form of load cells 205 mounted on or integrated within display device 105. In general, a deformation detection device produces or generates one or more deformation detection signals as a function of the deformation of the deformable display device 105. As a result, the deformation detection signals are indicative of the deformation (or the deformation properties) of the deformable display device (e.g., where a deformation is and the degree thereof). An example of a deformation detection device may take the form of load cells 50 mounted or integrated with display device 105. According to one example embodiment, load cells 205 are bonded onto display device 105 such that bending of the display device 105 produces corresponding analog (or, in an alternate embodiment, digital) electrical load cell signals 215, serving as deformation detection signals, in one or more of the load cells 205. In an example, the signals 215 generated from load cells 205 can be proportional to the amount of bend in the display device 105; in other words, the signals 215 are generated from load cells 205 in response to (or as a function of) a deformation in the display device 105. In general, the signals 215 can convey information about where deformations occur in the display device 105, what kind of deformations they are (e.g., concave or convex), the degree of the deformations, and the movement of the deformation (bend) across the surface of the display device 105. In an example, the signals from load cells 205 can be conveyed on signal paths, such as circuits 210, to the computing device 130 taking, for example, the form of a programmable computer or other electronic device capable of interpreting the signals to modify a process running or the computing device 130 or to generate display deformation data. According to an embodiment, if the signals 215 are analog signals, they are converted to digital data and processed in the computing device 130 to determine the location and relative motion of bends in the display device 105. Alternatively, separate analog to digital circuits may be employed to digitize the signals 215, if in analog form, prior to delivery to the computing device 130. As noted above, the embodiment depicted in FIG. 2 is an example, and the concepts described may be applied in systems in which the deformation of the display device is monitored by apparatus external to the display device, and the signals 215 generated as a function of the deformation in the display device 105 are generated by a component other than the display device 105 itself. Additionally, future flexible/deformable display devices may incorporate technology to produce signals similar in function to the signals 215 described above; such future display devices can be incorporated, for example, through reprogramming or replacement of the bend detection module 132 (illustrated in FIG. 1) within the computing device 130.

According to another example embodiment, at least some of load cells 205 can be oriented fully or partially transverse to one another in order that bends and contours in display device 105 can be ascertained from the signals 215. In one embodiment, using the relative magnitude of the signals from load cells 205 and the location of the respective load cells 205 on the display device 105, the bend detection module 132 can determine the approximate or exact deformation of display device 105 in three dimensions, and record bend or contour data representing the actual bends or contours in a storage device or memory on or off-board the computing device 130 (e.g., within the bend information memory device 136). Additionally, the bend detection module 132 (illustrated in FIG. 1) can use data from the load cells 205 to determine movement of a particular bend across the surface of the display device 105. According to still other examples (not specifically illustrated), the bend or contour of display device 105 may be determined using other deformation detection devices or systems, such as from images of the display device captured from one or more cameras, where the images are processed in order to determine the deformation of the display device 105. In such examples, multiple successive images can be captured and analyzed to determine movement of bends across a flexible display, such as display device 105.

Figure 3:
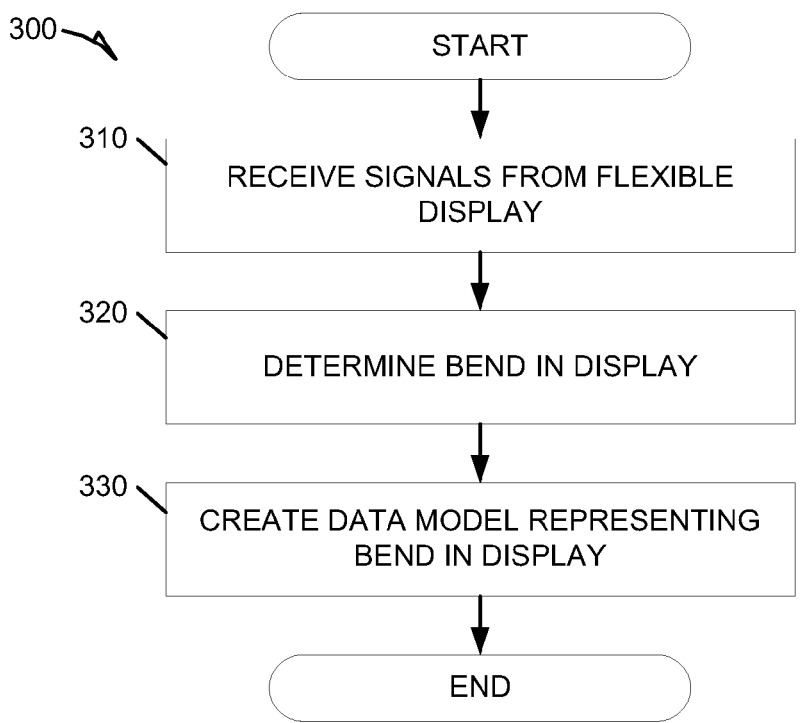
FIG. 3 is a flowchart illustrating a method for determining the deformation of a flexible display, according to an example embodiment.

FIG. 3 is a flowchart illustrating a method for determining the deformation of a flexible display, according to an example embodiment. The depicted method may be embodied as a computer program 300, illustrating an example computer program suitable for determining the deformation, resulting in bends or contours, of the flexible display device 105. In an example the computer program 300 can be performed (e.g., executed) within the computer device 130 (illustrated in FIG. 1). According to program 300, at operation 310 load cell signals 215 are received from load cells 205. In an example, the program 300 can continue at operation 320 with the computing device 130 determining the relative degree of strain or bend on the load cells 205, which can be correlated to a bend or contour in the display device 105. In certain examples, the computing device 130 can use stored data indicative of the locations of each of load cells 205 on display device 105, to assist in determining bend locations within the display device 105. The computing device 130 can also use a set of predetermined coefficients indicative of a correlation between load cell signals and respective physical display bending or deformation characteristics (i.e., coefficients selected expressly or inferentially prior to the reception of the load cell signals 215). At operation 330, the computer program 300 can determine the relative bend in each section of display device 105 to create a data model that corresponds to or describes the physical deformation, such as bend or contour properties, or characteristics, of display device 105. In some examples, the deformation data model (also referred to a bend data model or simply bend information) can also include data associated with movement of the deformation (bend or contour) across the surface of the flexible display. The above operations may be executed one or more times. Repeated executions may be performed on a periodic basis, or may be performed upon detection of an event (such as a change in the load cell signals 215) or any combination thereof. According to an example embodiment, computer program 300 operates on a processing unit, such as that described with respect to FIG. 9, and is stored in a memory device or storage device in or off-board the computing device 130. Note that the computer program discussed above, as well as any computer programs discussed herein, can be implemented within a hardware module such as on an application specific integrated circuit (ASIC), field-programmable gate array (FPGA), or similar programmable hardware device.

Figure 4A:
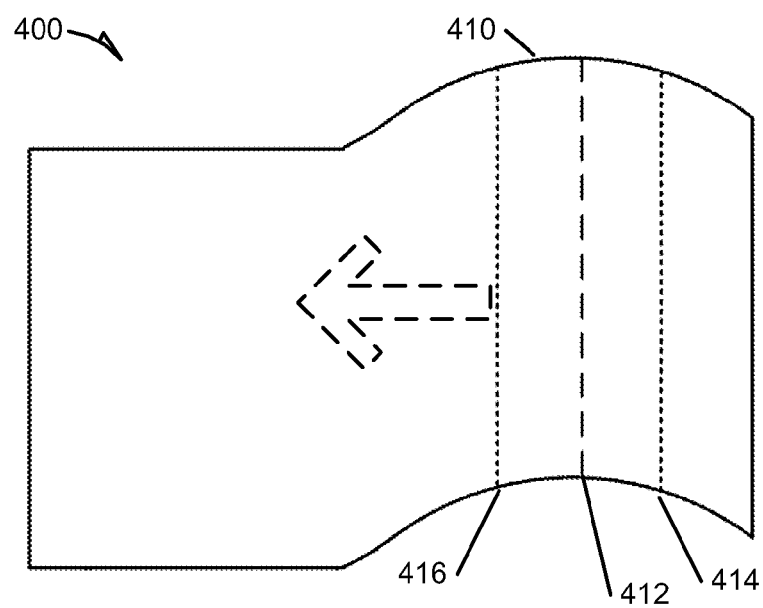
FIG. 4A-B is a block diagram illustrating example bends and associated movement on a flexible display, according to an example embodiment.
Figure 4B:
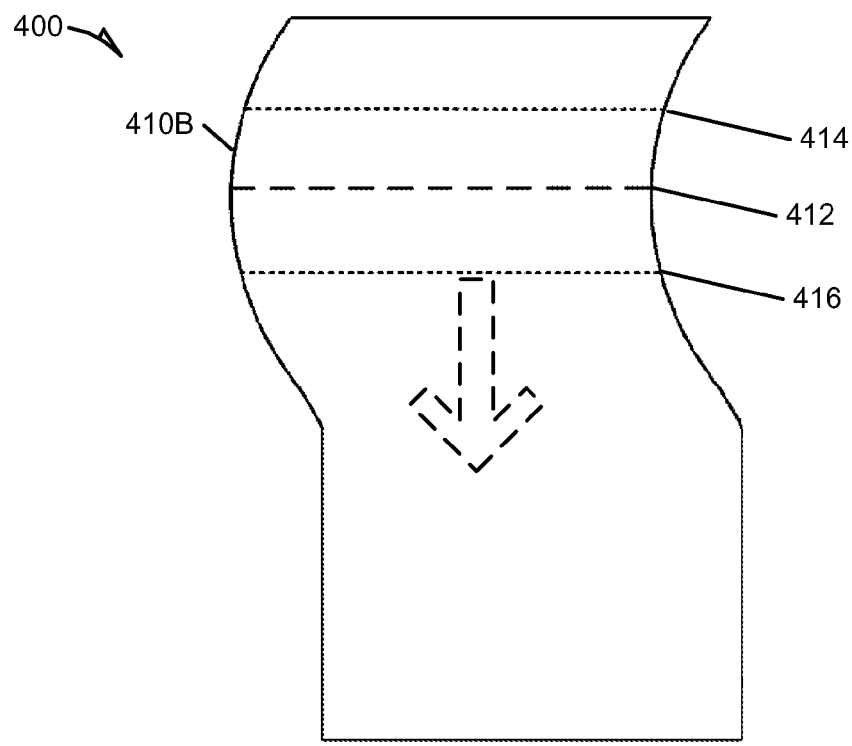

FIG. 4A-4B are block diagrams illustrating example bends and associated movement across a flexible display 400, according to an example embodiment. A flexible display 400 is illustrated in FIG. 4 with a deformation (bend) 410. In an example, the deformation 410 can include an apex 412 and two edges (414, 416). Note that the arrow depicted within FIG. 4 is indicating the direction of movement of deformation 410, but is not actually part of the deformation. In certain examples, the apex 412 of the deformation 410 can include an axis; in this example, the axis is running vertically across the flexible display 400. In this example, the axis could be said to be at zero or 180 degrees, relative to the user or a vertical orientation detected by the computing device 130. According to other examples, the axis can be in any angular orientation relative to the display. The angular orientation can be represented as a number between zero and 180 degrees or between zero and 270 degrees, depending on whether there is any benefit in distinguishing between a 90 degree orientation and a 270 degree orientation.

As noted above, the example deformation in FIG. 4 can include edges (414, 416), which can be referred to as a leading edge (edge 416) and/or a trailing edge (edge 414). A leading or trailing edge can be defined as a location where the localized deformation (bend) exceeds or transgresses a pre-defined threshold. Whether an edge is leading or trailing is determined based on the movement of the deformation, such as deformation 410. In this example, because the deformation 410 is shown moving towards the left side of the flexible display 400, the leading edge is represented by edge 416 and the trailing edge by edge 414.

FIG. 4B depicts a similar deformation 410B with a horizontal axis (e.g., 90 degrees from vertical). Alternatively, FIG. 4B could be viewed as depicting the flexible display 400 rotated into a portrait orientation, with the deformation 410B continuing to be in a relative orientation of zero or 180 degrees. In certain examples, the flexible display 400 can include accelerometers or other mechanisms for indicating orientation. The signal from the accelerometer can be combined with the relative orientation of the deformation, such as deformation 410B, by the computing device 130 and used to invoke a process modification on the computing device 130.

Figure 5:
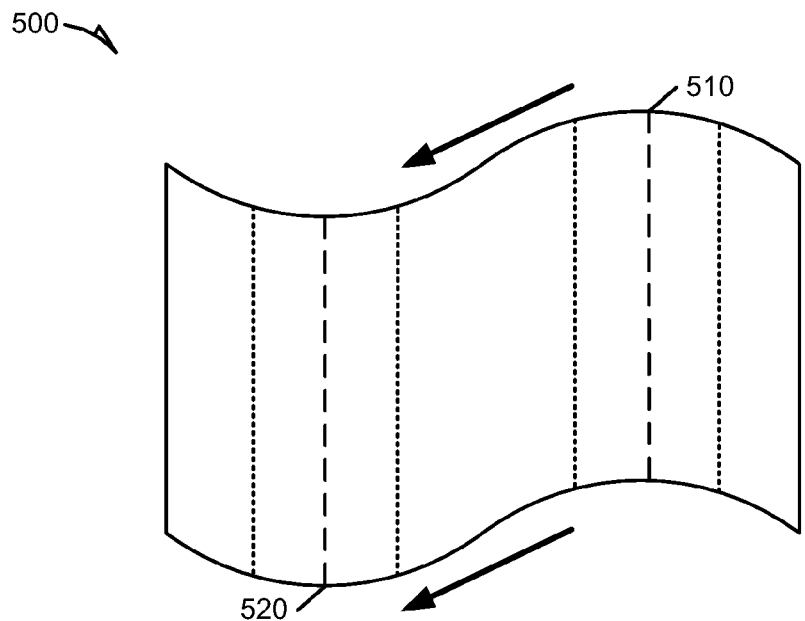
FIG. 5 is a block diagram illustrating the movement of a bend across a flexible display, according to an example embodiment.

FIG. 5 is a block diagram illustrating movement of a bend across a flexible display 500, according to an example embodiment. In this example, a bend is illustrated moving from a first location 510 across the surface of the flexible display 500 to a second location 520. This type of bend gesture, a bend combined with movement of the bend, can be used to invoke various user-interface operations. For example, the bend gesture illustrated in FIG. 5 can be used to activate a text selection operation within a word processing application. In another example, the bend gesture could be used to activate a page turn operation within an e-reader application. In yet another example, the bend gesture can be used to activate an image manipulation operation, zoom in/out, rotate, within an image viewer or editor application.

Figure 6:
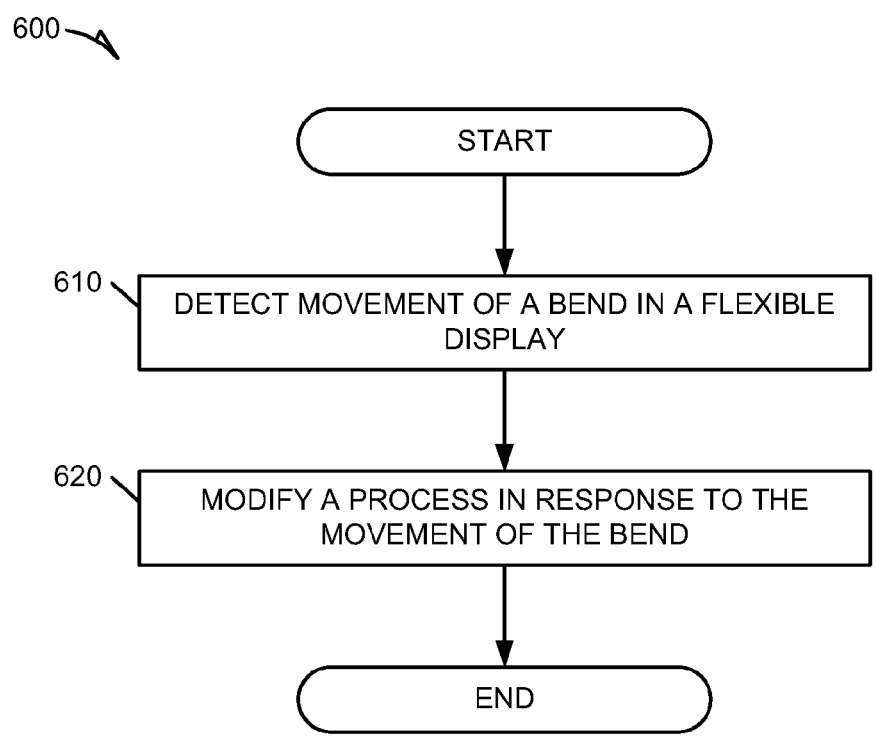
FIG. 6 is a flowchart illustrating a method of controlling a process through the detection of bend movement across a flexible display, according to an example embodiment.

FIG. 6 is a flowchart illustrating a method 600 of controlling a process through detection of bend movement across a flexible display, according to an example embodiment. In an example, the method 600 can include operations such as detecting movement of a bend 610 and modifying a process 620. The method 600 can begin at operation 610 with the bend detection module 132 detecting movement of a bend across the surface of a flexible display, such as display device 105. The method 600 can continue at operation 620 with the process modification module 134 modifying a process running on computing device 130 based on the detected movement of a bend in the flexible display (e.g., display device 105). Modifying a process can include generating user-interface commands that will be interpreted by application running on the computing device 130. For example, the method 600 can be used to detect a user bending a flexible display, which is displaying an eBook, to invoke a page turn operation (e.g., modify the e-reader process by sending in a page turn command). In another example, the method 600 can be used to detect a user bending a flexible display that is displaying a word processing application, at operation 610, to invoke a text selection operation, at operation 620. In the text selection example, the user may initiate a bend at a location on the flexible display associated with the start of the text to be selected. The user can then move the bend to select a segment of text in the displayed document, again at operation 620. In certain examples, the user can invoke a subsequent copy command by inducing a different bend or bend and movement combination, illustrated further in reference to FIG. 8 below.

In another example, initiation of the bend could occur in the area of a displayed object on the screen, such as an icon or line of text displayed on the screen, detected at operation 610. Movement of the bend can cause a corresponding movement of the object such that the object remains in the bend as the bend moves, processed in operation 620. Thus, if a horizontal bend were initiated in coincidence with a line of text, movement of the bend up or down the display would result in the corresponding movement of the line of text up or down the display in a scrolling fashion. Other text not in coincidence with the bend would be correspondingly scrolled in conjunction with the movement of the bend. In an example, the speed of the movement detected can be translated into a corresponding scroll speed. In another example, the speed of the movement can be translated into a magnitude associated with the scroll command. In certain examples, the direction of the movement can be translated into a polarity associated with a user-interface command. For example, if the bend is detected moving in a vertically positive (upwards) direction a positive polarity can be associated with the selected command. If the user-interface command is a zoom command, a positive polarity indicates a zoom-in (e.g., enlarge) operation. Conversely, if the bend is detected moving in a vertically negative direction (downwards) a negative polarity can be associated with the user-interface command (e.g., zoom-out). Applications running on the computing device 130 can interpret the user-interface commands resulting from the process modification operation 620 appropriately for the context of the application.

Figure 7:
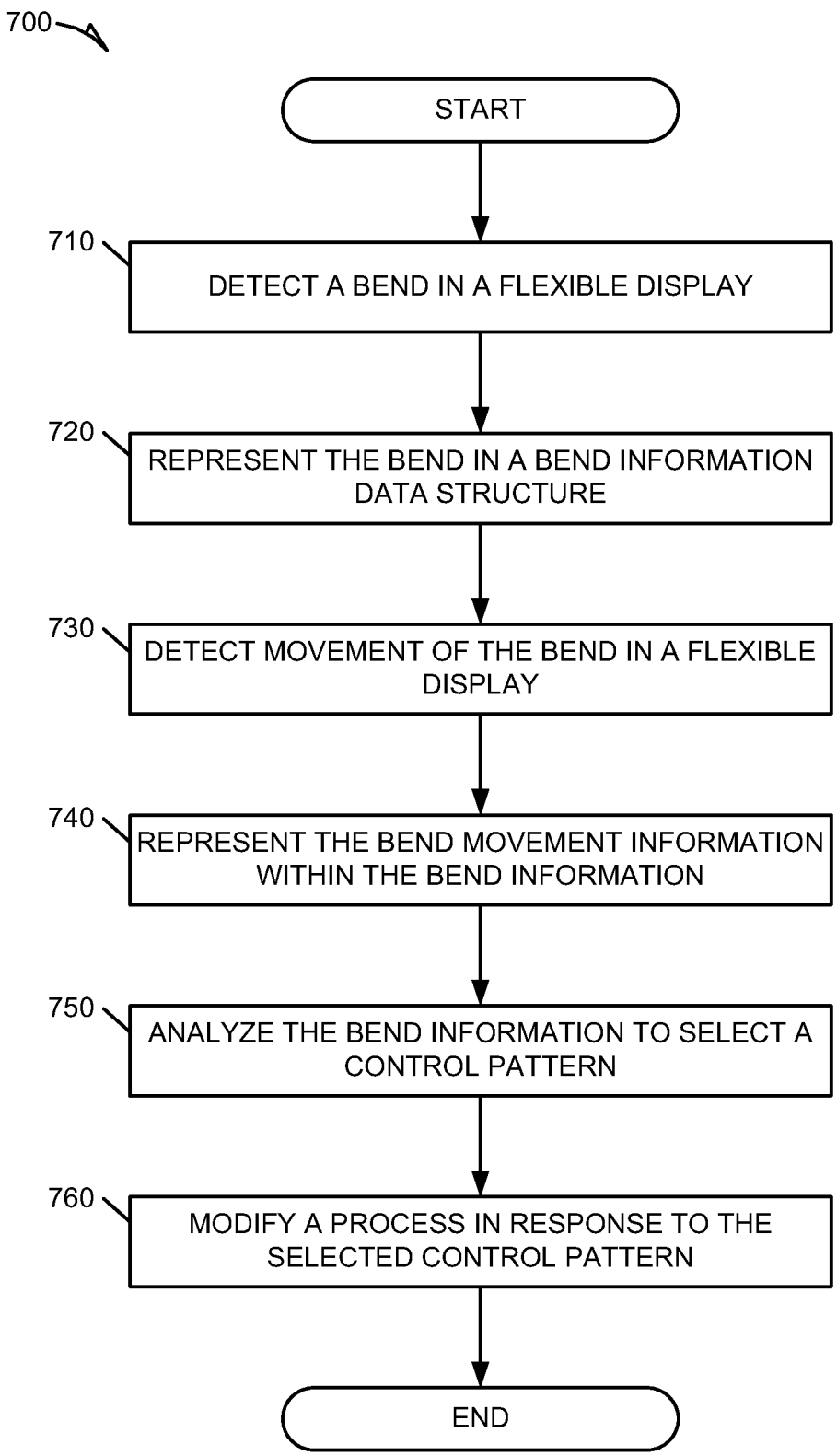
FIG. 7 is a flowchart illustrating a method of controlling a process through the detection of bend movement across a flexible display, according to an example embodiment.

FIG. 7 is a flowchart illustrating a method 700 of controlling a process through detection of bend movement across a flexible display, according to an example embodiment. In an example, the method 700 can include operations such as detecting a bend 710, representing the bend in a bend information data structure 720, detecting movement of the bend 730, representing the bend movement in the bend information data structure 740, analyzing the stored bend information 750, and modifying a process 760. The method 700 can begin at operation 710 with the computing device 130 detecting a bend (deformation) in a flexible display, such as display device 105. In certain examples, the bend detection operation 710 can be accomplished by the bend detection module 132 processing the signals 215 received from the display device 105 over interface 145.

At operation 720, the method 700 can continue with the computing device 130 representing the bend detected in the display device 105 in a bend information data structure. According to an example, the bend information data structure can be stored in the bend information memory device 136 and contains data representing a bend and associated movement of the bend. The data representing the bend can include bend axis orientation, location, leading edge location, trailing edge location, and height, among other things. The bend movement information can include a speed, direction, and acceleration data. In some examples, the movement information can be stored in a vector. In certain examples, the bend information data structure can be stored in any memory device coupled to or embedded within computing device 130.

According to an example, the method 700 continues at operation 730 with the computing device 130 detecting movement of the bend across the display device 105. In certain examples, the computing device 130 can detect movement of a bend from a first area of the display device 105 to a second area of the display device 105. In other examples, the bend detection module 132 rapidly samples signals 215 to facilitate detection of any indication of movement in a bend detected in the display device 105. The display device 105 can include a large number of bend (load or strain) sensors (e.g., a much denser array of sensors than depicted in FIG. 2) to assist in detecting minute movements in a deformation induced on a flexible display.

At operation 740, the method 700 can continue with the computing device 130 representing the bend movement information within the bend information data structure. The bend movement data is stored in association with a particular bend causing the movement. In certain examples, the bend detection module 132 can interpret the bend movement data received from the display device 105 and store the movement data in memory, such as in the bend information memory device 136. In an example, the bend movement information extracted by the bend detection module 132 can include movement direction, speed, and acceleration (or deceleration) data. In some examples, the bend movement information can also include bend magnitude or shape information. For example, if the curvature of the bend is changing (smaller or larger) this information can also be extracted by the bend detection module 132 and be stored for future processing.

At operation 750, the method 700 can continue with the computing device 130 analyzing the bend information (e.g., bend location and movement information) to select a control pattern. In certain examples, control patterns can be developed to match bend information profiles with process modifications. A bend information profile can include initial location and orientation of a bend coupled with subsequent movement information (e.g., direction, speed, acceleration). Bend information profiles can be viewed as describing a deformation or bend gesture (e.g., a particular bend and movement combination).

Finally, the method 700 can conclude at operation 760 with the computing device 130 modifying a process in response to the selected control pattern. In an example, the process modification module 134 can analyze the bend information to determine an appropriate process modification. In addition to the user interface related modification discussed above, bend gestures can be used to launch new processes (e.g., applications), close processes, or initiate an application specific command, among other things.

Figure 8:
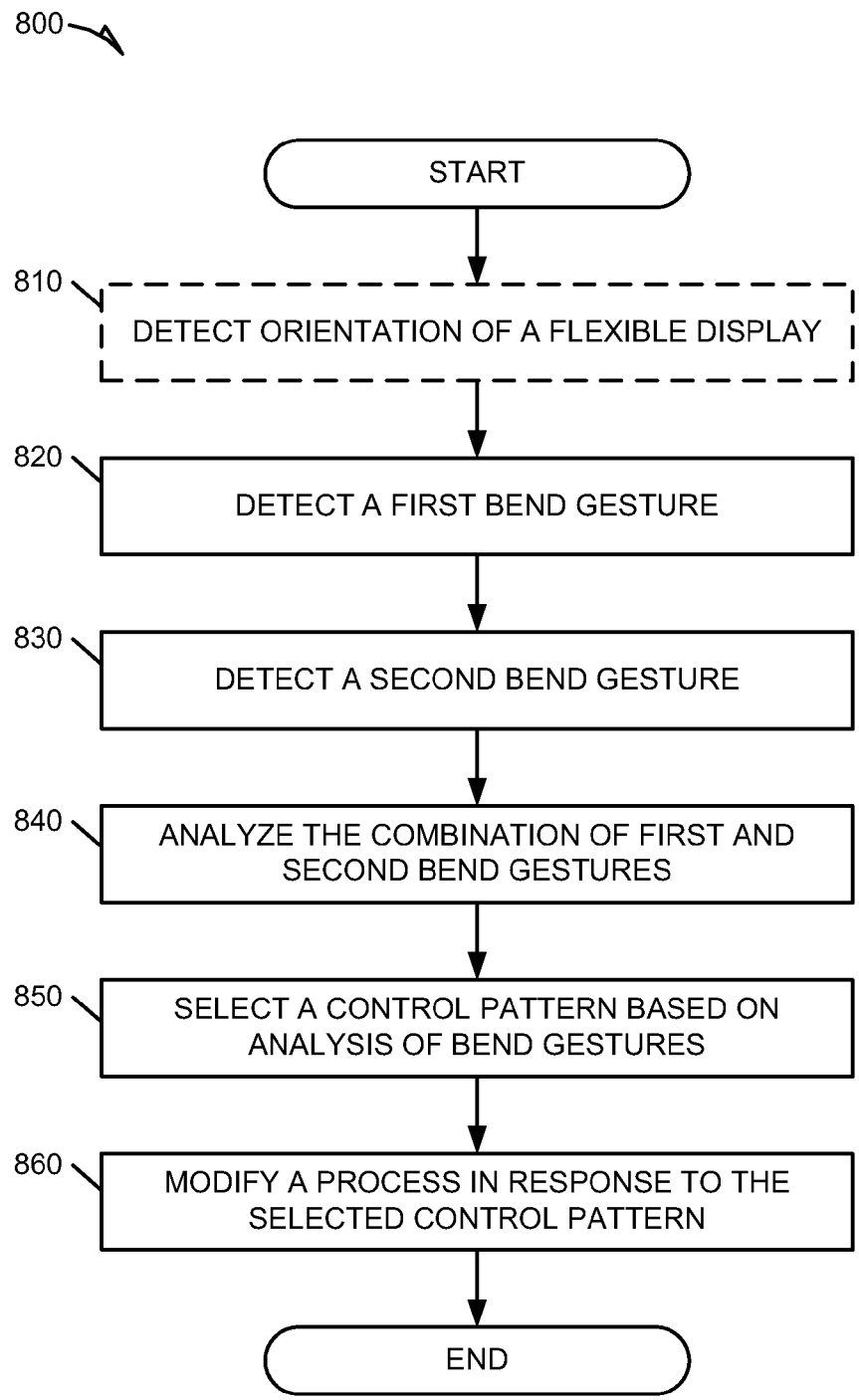
FIG. 8 is a flowchart illustrating a method of controlling a process through the detection of multiple bend gestures on a flexible display, according to an example embodiment.

FIG. 8 is a flowchart illustrating a method of controlling a process through detection of multiple bend gestures on a flexible display, according to an example embodiment. In this example, the computing device 130 can invoke process modifications based on a series of two or more bend gestures performed in sequence. The method 800 can include operations such as detecting a first bend gesture (820), detecting a second bend gesture (830), analyzing the combination of bend gestures (840), selecting a control pattern (850), and modifying a process (860). Optionally, the method 700 can also include an operation for detecting orientation of the display device (810). This optional operation is shown at the beginning of method 800, but it could be performed any time prior to analyzing the bend gestures at operation 840.

According to an example, the method 800 begins at operation 820 with the computing device 130 detecting a first bend gesture from signals 215 received from the display device 105. At operation 830, the method 800 can continue with the computing device 130 detecting a second bend gesture from signals 215 received from the display device 105. In an example, the bend gestures can be detected by the bend detection module 132 within the computing device 130.

At operation 840, the method 800 can continue with the computing device 130 analyzing the combination of first and second bend gestures applied to the display device 105. In certain examples, the process modification module 134 extracts data representing the bend gestures, stored in the bend information memory device 136, to analyze the bend gestures. At operation 850, the method 800 can continue with the computing device 130 selecting a control pattern based on analysis of the bend gestures. Finally, at operation 860, the method 800 can conclude with the computing device 130 modifying a process in response to the selected control pattern. Note that in certain examples, the computing device 130 can modify a process based on identification of a certain bend gesture or combination of bend gestures without selection of a control pattern. In these examples, look-up tables or similar database mechanisms can be used to facilitate determining an appropriate process modification.

Figure 9:
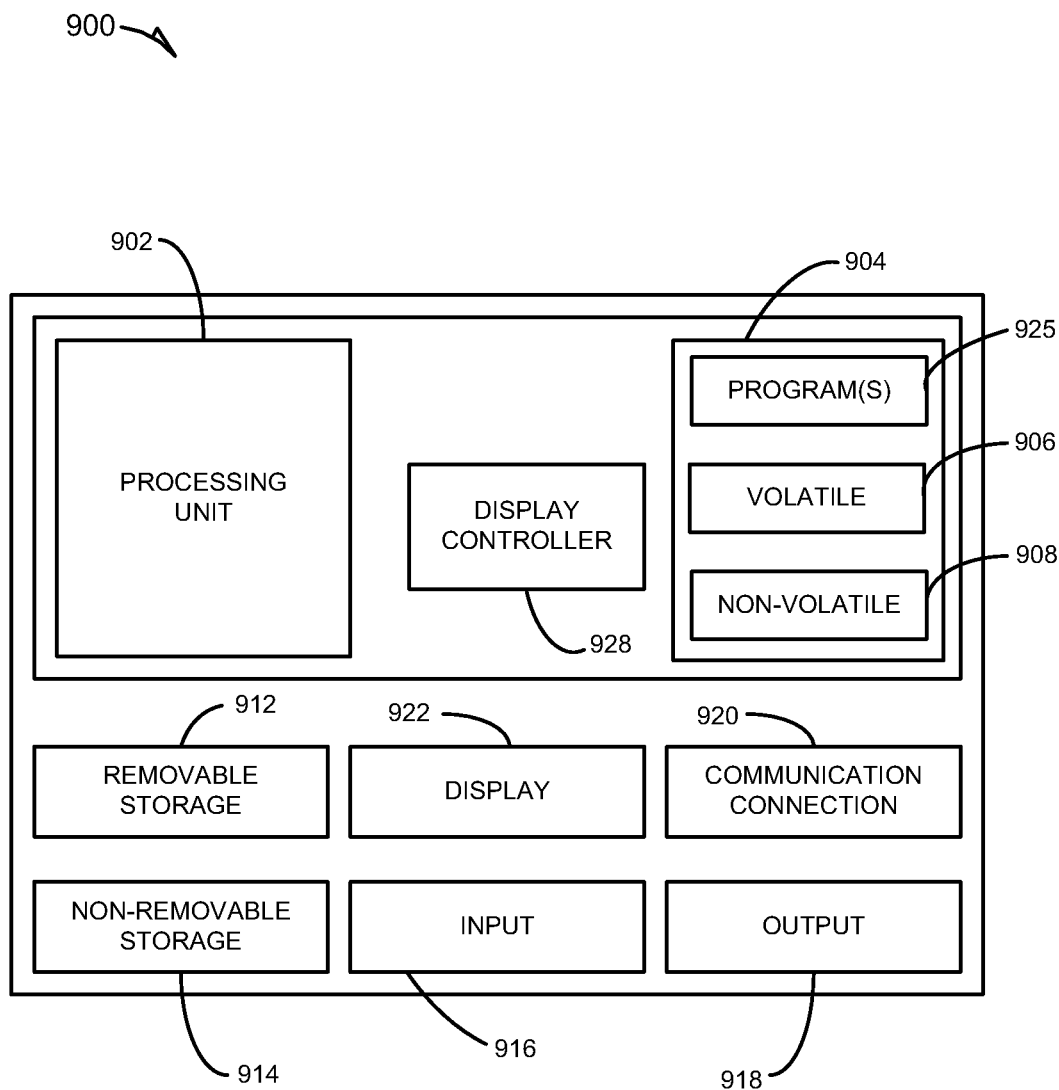
FIG. 9 is a block diagram illustrating a computing platform suitable for use in certain example embodiments of the present technology.

FIG. 9 is a block diagram illustrating a computing platform suitable for use in certain example embodiments of the present technology. In an example, the mobile device 900 includes a processing unit 902, memory 904, removable storage 912, non-removable storage 914, display 922, and display controller 928. The processing unit 902 may include one or more processing units or may include one or more multiple-core processing units. Memory 904 may include volatile memory 906 and non-volatile memory 908. Mobile device 900 may include a variety of device-readable media, such as volatile memory 906 and non-volatile memory 908, removable storage 912 and non-removable storage 914. The storage may include random access memory (RAM), read-only memory (ROM), erasable programmable read-only memory (EPROM) and electrically erasable programmable read-only memory (EEPROM), flash memory or other memory technologies, or any other medium capable of storing machine-readable instructions and data that may be present in a mobile electronic device. Mobile device 900 may include input 916, output 918, and a communication connection device 920.

The display 922 included within the mobile device 900 can be a flexible display capable of producing signals suitable for use within the methods described herein. In certain examples, the display 922 communicates with the display controller 928, which can control the images displayed on the display 922. Additionally, according to some examples, the display controller 928 can also perform functions similar to those described in reference to the bend detection module 132. According to other examples, the display controller 928 can receive and distribute signals 215 for subsequent processing within the processing unit 902.

The mobile device 900 typically operates in a networked environment using the communication connection device 920 to connect to one or more networks, such as a wireless telephone network. Through the communication connection device 920, the mobile device 900 may connect to one or more remote computers. The remote computer may include a personal computer (PC), server, router, network PC, a peer device, or other common network input, or the like. The communication connection device 920 may connect to various network types that may include a wireless telephone network, a Local Area Network (LAN), a Wide Area Network (WAN), the Internet, a proprietary subscription-based network, or other networks. The mobile device 900 also may include wireless telephone capabilities to provide voice telephone service via a wireless telephone network.

Machine-readable instructions stored on a machine-readable medium are executable by the processing unit 902 of the mobile device 900. The memory 904, removable storage 912, and non-removable storage 914 are examples of articles including a non-transitory machine-readable storage medium. For example, a program with instructions that may be stored in memory 904 and when executed by the processing unit 902 can cause the mobile device 900 to perform one or more of the methods described herein. Other programs may also be stored on a machine-readable medium, such as a browser application providing web browsing functionality for the mobile device 900.

Method examples described herein can be machine or computer-implemented, at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code may be stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above detailed description includes references to the accompanying drawings, which form a part of the detailed description. The drawings show, by way of illustration, specific embodiments in which the subject matter can be practiced. These embodiments are also referred to herein as "examples." Such examples can include elements in addition to those shown and described. However, the present inventors also contemplate examples in which only those elements shown and described are provided. It will be readily understood to those skilled in the art that various other changes in the details, material, and arrangements of the parts and method stages that have been described and illustrated herein may be made without departing from the principles of the inventive subject matter.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or method that includes elements in addition to those listed after such a term in a claim are still deemed to fall within the scope of that claim. Moreover, in the following claims, the terms "first," "second," and "third," and the like are used merely as labels and are not intended to impose numerical requirements on their objects.

The above description is intended to be illustrative, and not restrictive. For example, the above-described examples (or one or more features thereof) may be used in combination with each other. Other embodiments can be used, such as by one of ordinary skill in the art upon studying the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
   detecting movement of a bend in a deformable display panel, the bend moving from a first area to a second area of the deformable display panel; and
   modifying a process running on a device coupled to the deformable display panel in response to detecting the movement of the bend, wherein modifying the process running on the device includes generating at least one user-interface command associated with the movement of the bend.

2. The method of claim 1, wherein generating the at least one user-interface command includes generating a scrolling command.

3. The method of claim 2, wherein the scrolling command includes scroll speed and direction information derived from a speed and a direction of the movement of the bend.

4. The method of claim 2, wherein the scrolling command includes scroll direction information derived from a determined direction of movement of the bend.

5. A method comprising:
   detecting movement of a bend in a deformable display panel, the bend moving from a first area to a second area of the deformable display panel; and
   modifying a process running on a device coupled to the deformable display panel in response to detecting the movement of the bend;
   detecting an orientation of the deformable display panel; and
   wherein detecting the movement of the bend includes determining the direction of the movement of the bend in relation to the orientation of the deformable display panel.

6. A method comprising:
   detecting movement of a bend in a deformable display panel, the bend moving from a first area to a second area of the deformable display panel; and
   modifying a process running on a device coupled to the deformable display panel in response to detecting the movement of the bend, wherein detecting the movement of the bend on the deformable display panel includes determining a direction and a speed of the movement.

7. The method of claim 6, wherein modifying the process running on the device includes translating the direction and the speed of the movement into a polarity and a magnitude associated with a user-interface operation.

8. The method of claim 7, wherein modifying the process includes a zooming operation associated with data displayed on the deformable display panel, translating the direction into an enlarging or reducing operation, and translating the speed into a percentage of zoom.

9. A method comprising:
   detecting movement of a bend in a deformable display panel, the bend moving from a first area to a second area of the deformable display panel; and
   modifying a process running on a device coupled to the deformable display panel in response to detecting the movement of the bend;
   detecting movement of a second bend in the deformable display panel, the second bend moving from the second area to a third area within the deformable display panel and occurring proximate in time to detecting the movement of the bend; and
   wherein modifying the process running on the device includes analyzing the movement of the second bend.

10. A method comprising:
    detecting movement of a bend in a deformable display panel, the bend moving from a first area to a second area of the deformable display panel;
    modifying a process running on a device coupled to the deformable display panel in response to detecting the movement of the bend; and
    detecting a user-interface object displayed on the deformable display panel, the user-interface object located proximate to an initial apex location of the bend, wherein the user-interface object moves across the deformable display panel in response to the movement of the bend.

11. A non-transitory machine-readable storage medium including instructions, which when executed by a computing device coupled to a deformable display panel, cause the computing device to:
    detect movement of a bend in the deformable display panel by detecting an apex of the bend moving from a first area of the deformable display panel along a surface of the deformable display panel to a second area of the deformable display panel;
    modify a process running on a device coupled to the deformable display panel in response to detecting the movement of the bend; and detect a user-interface object displayed on the deformable display panel, the user-interface object located proximate to an initial apex location of the bend, wherein the user-interface object moves across the deformable display panel in response to the movement of the bend.

12. A non-transitory machine-readable storage medium including instructions, which when executed by a computing device coupled to a flexible display, cause the computing device to:
   detect movement of a bend in the flexible display, the bend moving from a first area to a second area of the flexible display; and
   modify a process running on the computing device in response to detecting the movement of the bend, wherein the instructions include instructions that cause the computing device to modify the process by generating at least one user-interface command associated with the movement of the bend.

13. A system comprising:
   a flexible display device including a means for generating signals indicative of movement of a bend in the flexible display by generating signals indicative of an apex of the bend moving from a first area of the flexible display along a surface of the flexible display to a second area on the flexible display;
   a computing means for,
      receiving the signals indicative of movement of the bend in the flexible display, and
      modifying a process running on the computing means based on the signals indicative of movement of the bend in the flexible display; and
   a non-transitory machine-readable storage medium including instructions, which when executed by the computing means coupled to the flexible display, cause the computing means to:
      detect movement of the bend moving from the first area to the second area of the flexible display; and
      cause the computing means to generate at least one user-interface command associated with the movement of the bend.

* * * * *